United States Patent [19]

Copperi et al.

[11] 4,049,917

[45] Sept. 20, 1977

[54] PCM TELECOMMUNICATION SYSTEM WITH MERGER OF TWO BIT STREAMS ALONG A COMMON SIGNAL PATH

[75] Inventors: Maurizio Copperi; Luciano Nebbia, both of Turin, Italy

[73] Assignee: CSELT - Centro Studi e Laboratori Telecomunicazioni S.p.A., Turin, Italy

[21] Appl. No.: 679,787

[22] Filed: Apr. 23, 1976

[30] Foreign Application Priority Data

Apr. 23, 1975 Italy .................................. 68030/75

[51] Int. Cl.² ............................................. H04J 3/04
[52] U.S. Cl. .............................. 179/15 AP; 179/15 A; 340/345 DD
[58] Field of Search ........... 179/15 AP, 15 A, 15 BL; 325/38 R, 38 B; 340/347 DD

[56] References Cited

U.S. PATENT DOCUMENTS

| | | | |
|---|---|---|---|
| 3,707,680 | 12/1972 | Gabbard | 179/15 AP |
| 3,927,268 | 12/1975 | Sciulli | 179/15 AP |

Primary Examiner—David L. Stewart
Attorney, Agent, or Firm—Karl F. Ross

[57] ABSTRACT

A transmitting terminal, communicating via a PCM link with a remote receiving terminal, processes two simultaneously arriving bit streams consisting of recurrent frames of 32 time slots, 29 of these time slots containing 8-bit code words which represent voice samples from as many PCM channels. The two arriving bit streams are transcoded by an ADPCM (adaptive differential pulse-code modulation) technique to convert the 8-bit words into substantially equivalent 4-bit words which are then combined, in interleaved relationship, into a single bit stream sent to the receiving terminal, each frame of this composite bit stream having 29 of its 32 time slots occupied by two four-bit words respectively taken from the original bit streams. At the receiving terminal a complementary procedure is followed to separate the two groups of 4-bit code words from each other and to reconvert each of them into an 8-bit word, with substantial reconstitution of the original bit streams.

21 Claims, 6 Drawing Figures

PCM TELECOMMUNICATION SYSTEM WITH MERGER OF TWO BIT STREAMS ALONG A COMMON SIGNAL PATH

FIELD OF THE INVENTION

Our present invention relates to a telecommunication system for the conveyance of pulse-code-modulated (PCM) message signals, specifically digitized voice samples, from a transmitting terminal to a receiving terminal, two groups of these message samples arriving simultaneously at the transmitting terminal in the shape of two sets of $2n$-bit code words forming part of recurrent frames in two original bit streams which are to be replicated at the receiving terminal for further handling.

BACKGROUND OF THE INVENTION

In the usual PCM telephone networks, voice samples are quantized in the form of 8-bit code words which are assembled in frames divided into a multiplicity of time slots, each time slot encompassing eight basic clock cycles or bit periods so as to accommodate an 8-bit word. Thus, in conformity with European telecommunication standards, a frame may consist of 32 time slots of which all but a few are allotted to message code words, with the remainder reserved for supervisory signal codes. Allowing for a synchronization code and for an identification code, such a frame may carry up to 30 8-bit code words representing as many PCM channels.

If two bit streams consisting of recurrent PCM frames arrive simultaneously at one terminal from which they are to be transmitted to another via a common PCM link, conventional techniques would require a doubling of the bit rate along that common path if the full information carried by the original code words is to be conveyed.

Recently there has been developed, especially for the transmission of voice samples in a telephone system, a technique known as adaptive differential pulse-code modulation (ADPCM) which utilizes predetermined characteristics of the human voice spectrum for short-term prediction of the magnitude of the next sample and quantizes the error, if any, between the actual and predicted samples. The quantization is exponentially weighted under the control of the quantized error signal itself. Reference in this connection may be made to commonly owned Italian patent No. 984,398 and to a paper (CIV-23) published by us in March 1974 in the Proceedings of the 21$^{st}$ International Electronic and Nuclear Congress of Rome, entitled PROTOTIPO DI LABORATORIO DI PCM DIFFERENZIALE CON ADATTAMENTO DEL PASSO DI QUANTIZZAZIONE PER TRASMISSIONI VOCALI (Laboratory Prototype of Differential PCM with Adaptation of the Quantization Rate of Voice Transmission).

OBJECTS OF THE INVENTION

An object of our present invention is to provide a method of jointly transmitting the code words of a pair of bit streams at their original bit rate, with their information content virtually intact, to a remote terminal via a single composite bit stream.

A related object is to provide an improved system for carrying out this mode of PCM message transmission.

It is also an object of our invention to provide circuitry for the purpose described which can be readily introduced into an established telecommunication system without major alterations of pre-existing facilities.

SUMMARY OF THE INVENTION

In accordance with our present invention, the $2n$-bit message code words from the frames of two original bit streams, arriving simultaneously at a first terminal, are each converted into a substantially equivalent $n$-bit code word, advantageously by the aforementioned ADPCM quantizing technique. The resulting groups of $n$-bit code words from the two original bit streams are then interleaved at the first terminal for transmission to a second terminal, via a common signal path linking these terminals, in frames of a composite bit stream having the same length as the frames of the original bit streams. At the second terminal the interleaved $n$-bit code words of the composite bit stream are separated and reconverted by a reverse transcoding procedure, into $2n$-bit words substantially corresponding to the original message code words, these reconverted words being then assembled into frames forming part of two reconstituted bit streams which substantially replicate the original bit streams.

With 8-bit code words, i.e. $n = 4$ as will be assumed hereinafter, the interleaved code words of the composite bit stream consist of four bits each and occupy respective halves of its time slots. By identically structuring the frames of the original, composite and reconstituted bit streams, i.e. by assigning homologous time positions in these frames to the supervisory and the message time slots, we can accommodate two 4-bit words, derived from 8-bit words in homologous time slots of the original bit streams, in respective halves of a homologous time slot of the composite bit stream; this simplifies the task of replicating the original bit streams by the reconstituted bit streams. The interleaving may be accomplished with the aid of electronic switch means such as multiplexers having two sets of inputs and one set of outputs.

Pursuant to another feature of our invention, the transcoders performing the conversion from eight to four bits and vice versa may be bypassed by supervisory signal codes which can thus be transferred substantially unchanged from supplemental time slots of the original bit stream via corresponding time slots of the composite bit stream to homologous time slots of the reconstituted bit streams. This applies in particular to indentification codes inasmuch as synchronization codes, usually carried in the first time slot of each frame, can be locally generated for the composite and reconstituted bit streams at the first and the second terminal, respectively. The identification codes may be carried in the original bit streams in a first supplemental time slot, preferably in the 17$^{th}$ slot of a 32-slot frame, with the immediately following (e.g. 18$^{th}$) time slot left vacant. Concurrently arriving identification codes from respective frames of the original bit streams are then transferred to homologous first and second supplemental time slots, respectively, of a frame of the composite bit stream, i.e. to its 17$^{th}$ and 18$^{th}$ time slots in the specific instance referred to.

Our improved PCM transmission method and system, therefore, enables the conveyance of message samples from 58 channels by a recurrent PCM frame of a structure conventionally designed for only 30 channels.

BRIEF DESCRIPTION OF THE DRAWING

The above and other features of our invention will now be described in detail with reference to the accompanying drawing in which.

SPECIFIC DESCRIPTION

Figure 1:
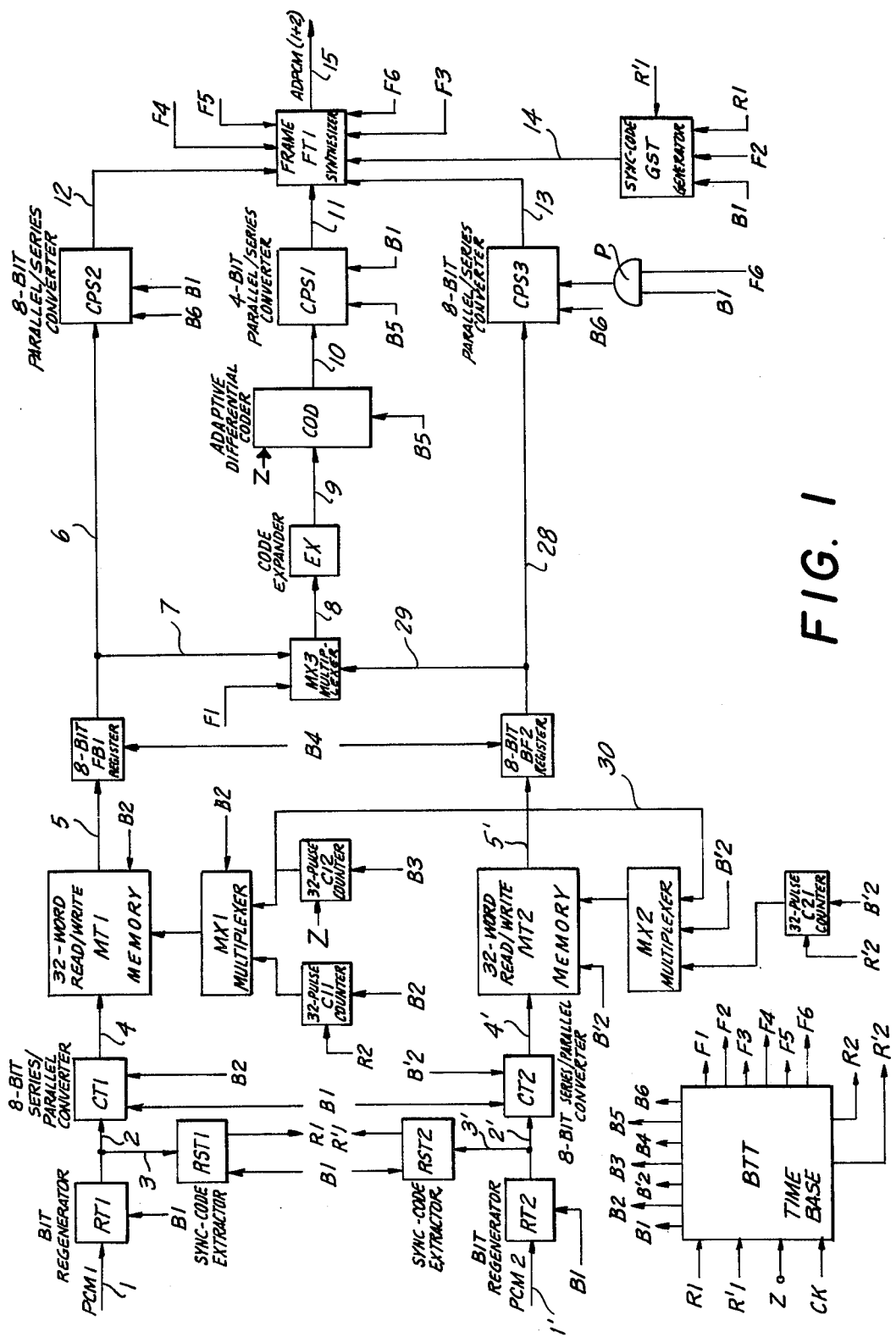
FIG. 1 is a block diagram of a transmitting terminal in a voice-communication system embodying our invention.

In FIG. 1 we have shown a transmitting terminal at the input end of a PCM link represented by an outgoing line 15. The terminal has two incoming lines 1 and 1' carrying two simultaneously arriving bit streams PCM1 and PCM2 each consisting of a recurrent frame of 32 time slots. As more fully described hereinafter with reference to FIGS. 2 and 3, 29 of these 32 time slots are allotted to respective PCM channels carrying digitized message samples in the form of 8-bit code words; two further time slots contain supervisory signals while the remaining time slot is empty. The two bit streams are suitably reshaped and adjusted as to voltage level in a pair of conventional bit regenerators RT1 and RT2 under the control of a periodic timing pulse B1, assumed to have a basic cadence of 2048 kHz corresponding to $2^{11}$ kbit/sec, emitted by a time base BTT in response to clock pulses CK of the same frequency. Bit regenerator RT1 feeds, via a lead 2, an 8-bit series/parallel converter CT1 and in parallel therewith, via a lead 3, a sync-code extractor RST1; in an analogous manner, bit regenerator RT2 feeds an 8-bit series/parallel converter CT2 and a sync-code extractor RST2 by way of leads 2' and 3'. Circuits CT1, CT2, RST1 and RST2 are loaded by the basic high-rate pulses B1; converters CT1 and CT2 are periodically discharged into respective multiples 4 and 4' under the control of pulses B2 and B'2, generated once per time slot by time base BTT. Multiples 4 and 4' terminate at respective read/write memories MT1 and MT2 each having 32 cells for the storage of as many 8-bit words; each memory cell is unequivocally assigned to a respective time slot in the recurrent frame of the associated bit stream and can be loaded, at corresponding instants, under the control of a respective 32-pulse counter C11, C21 via a multiplexer MX1 or MX2.

Counters C11 and C21 are zeroized by pulses R2 and R'2, emitted by time base BTT in response to verification signals R1 and R'1 from sync-code extractors RST1 and RST2, and are respectively stepped by the pulses B2 and B'2 occurring only if the corresponding synchronization codes are correctly received, i.e. if circuits RST1 and RST2 periodically generate the signals R1 and R'1. Each of these sync-code extractors detects, by suitable comparison circuits in a manner well known per se, an aternation of two synchronization codes A and B in the first time slots of successive frames and emits its verification signal R1 or R'1 after three successful comparisons, i.e. in response to a sequence of synchronization codes A - B - A; this signal is discontinued upon an interruption of the code alternation. Except for pulses B2, B'2, R2 and R'2, all the signals generated by time base BTT occur independently of signals R1 and R'1; they are, however, ineffectual without proper synchronization as will become apparent hereinafter.

Pulses B2 are also applied to memory MT1 and to multiplexer MX1 to condition a selected memory cell, addressed by the counter C11, for inscription of the code word read out from converter CT1 over multiple 4; analogously, pulses B'2 control the writing of a code word from converter CT2 in a cell of memory MT2 identified by counter C21. In the absence of pulses B2 and B'2, multiplexers MX1 and MX2 connect an output lead 30 of another 32-pulse counter C12 to memories MT1 and MT2 to address successive cells thereof for readout, over multiples 5 and 5', to a pair of 8-bit registers BF1 and BF2 serving as buffer memories. Counter C12 is stepped by pulses B3 from time base BTT, coinciding with pulses B2 and B'2 but occurring independently of the presence or absence of verification signals R1 and R'1. This counter, restarting from zero after reaching its maximum count of 31, is zeroized only at the beginning of operations by a start signal Z which may be manually generated and is also applied to time base BTT.

Registers BF1 and BF2 are periodically discharged under the control of pulses B4, also constantly emitted by time base BTT, having the same cadence as pulses B2, B'2 and B3. Register BF1 has an output multiple 6, terminating at an 8-bit parallel/series converter CPS2, and a branch multiple 7 extending to a multiplexer MX3 which is under the control of a signal F1 from time base BT; similarly, register BF2 feeds an 8-bit parallel/series converter CPS3 via a multiple 28 and also works into multiplexer MX3 through a branch multiple 29. Signal F1, which is a square wave of the same frequency as pulses B2 - B4, connects branch multiple 7 to an output multiple 8 of multiplexer MX3 during the first half of each time slot; in alternate half-cycles of this signal, i.e. during the second half of each time slot, branch multiple 29 is connected to output multiple 8.

The 8-bit code words temporarily stored in registers BF1 and BF2 are thus alternately supplied to a code expander EX whose operation is complementary to that of a code compressor (not shown) used to reduce a quantized amplitude sample of 12 bits to eight bits at the source of bit streams PCM1 and PCM2. Expander EX converts these 8-bit words into 12-bit words suitable for transcoding by the aforedescribed ADPCM technique; the re-expanded words are delivered over a multiple 9 through an ADPCM coder COD for conversion into 4-bit words read out over a multiple 10 to a parallel/series converter CPS1 under the control of a pulse sequence B5 from time base BTT having half the cadence of pulse trains B2 - B4. Converter CPS1, also stepped by the pulses B5, serially delivers the received bits under the control of pulses B1 via a lead 11 to a frame synthesizer FT1 also receiving the outputs of converters CPS2 and CPS3 over respective leads 12 and 13. Converter CPS2, loaded once per frame under the control of a pulse B6 from time base BTT, serially discharges the received signal code immediately thereafter in response to timing pulses B1; the serial discharge of converter CPS3, also loaded in the presence of pulse B6, is delayed by one time slot as the timing pulses B1 are applied to that converter not directly but through the intermediary of an AND gate P also receiving an enabling signal F6 from time base BTT. Coder COD is initially cleared by the start signal Z.

A sync-code generator GST, receiving output signals R1 and R'1 of extractors RST1 and RST2, is controlled by a signal F2 from time base BTT which is present only during every other frame and which may be regarded as a square wave of half the frame cadence. Under the control of pulses B1, and in the presence of verification signals R1 and R'1, generator GST produces on a lead 14, extending to frame synthesizer FT1, a first synchronizing code A at the beginning of every odd-numbered frame and a second synchronizing code B at the beginning of every even-numbered frame. Frame synthesizer FT1 assembles the several codes from leads 11 - 14, under the control of output signals F3 - F6 of time base FTT, into an outgoing bit stream on line 15 designated ADPCM(1+2) as more fully described hereinafter.

Figure 2:
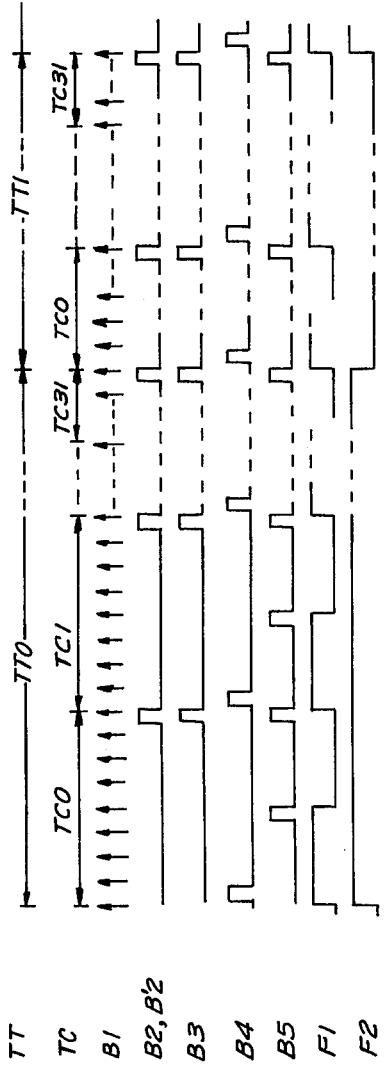
FIGS. 2 and 3 are two sets of graphs relating to the operation of the terminal of FIG. 1.

In top graph TT of FIG. 2 we have shown two consecutive frames TT0 and TT1 of the composite bit stream ADPCM(1+2) which are delayed by a full time slot, owing to the operation of circuits BF1, BF2 and CPS1 - CPS3, with reference to the corresponding frame periods of the incoming streams PCM1 and PCM2. Each frame consists of 32 time slots TC0, TC1, ... TC31 as indicated in the second graph TC. The third graph shows the timing pulses B1 establishes eight clock cycles or bit periods per time slot. The next two graphs show the pulses B2, B'2 and the pulses B3 normally coinciding therewith. As seen from the sixth graph, pulses B4 lag behind pulses B2, B'2 and B3 by about one clock cycle. Pulses B5, at twice the cadence of pulses B2 - B4, are shown in the seventh graph. The last two graphs of FIG. 2 illustrate the two square waves F1 and F2.

Figure 3:
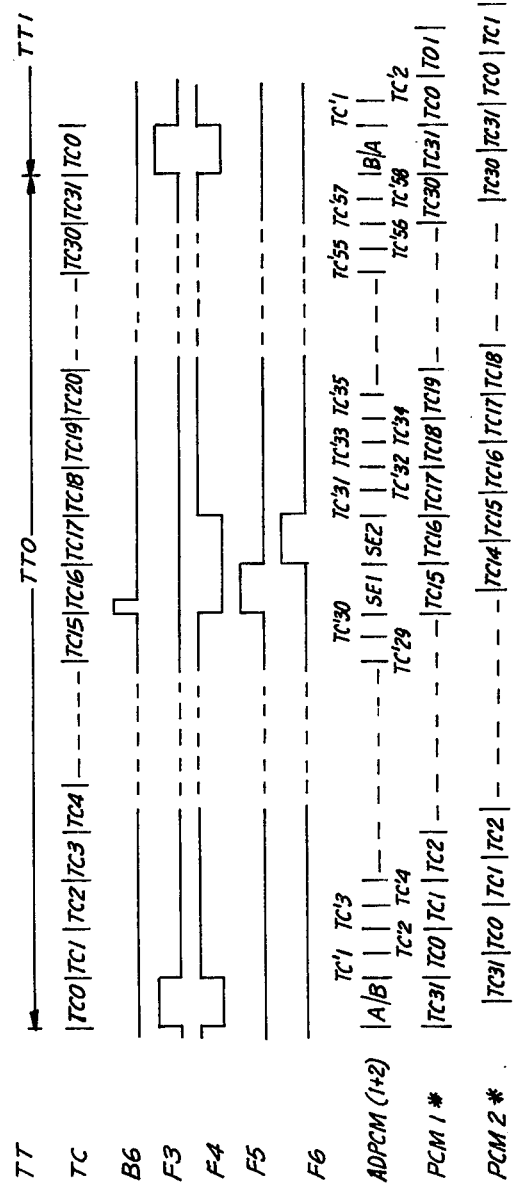

The top graph TT of FIG. 3 shows, on a larger scale, the first frame TT0 and the beginning of the next frame TT1 of bit stream ADPCM(1+2); the second graph TC again illustrates the 32 time slots TC0 - TC31 of frame TT0 together with the first time slot TC0 of frame TT1. In the original bit stream PCM1 or PCM2, time slots TC0 carry the alternating synchronizing codes A, B to be detected by extractor RST1 or RST2 in FIG. 1. Time slot TC16 contains signal codes used to identify, in a succession of frames, the several active PCM channels as is well known per se. The next time slot TC17 is empty. Thus, message signals are conveyed in time slots TC1 - TC15 and TC18 - TC31. Pulse B6, as shown in the third graph of FIG. 3, occurs at the beginning of time slot TC16 of each frame of the composite bit stream.

The next four graphs of FIG. 3 illustrate the several signals F3 - F6 controlling the frame synthesizer FT1 of FIG. 1. Signal F3 coincides with time slot TC0 and serves to insert the output of generator GST into the outgoing frame. Signal F4 comes into existence during the message time slots TC1 - TC15 and TC18 - TC31 to enable the readout of the contents of converter CPS1 to line 15. Signal F5 coincides with time slot TC16 and connects the output lead 12 of converter CPS2 to the line, whereas signal F6 connects the output lead 13 of converter CPS3 to the line at the time when the AND gate P is unblocked by the same signal. A complete frame of outgoing bit stream ADPCM(1+2) is shown in the antepenultimate graph of FIG. 3 and comprises a synchronzing code A (or B) in its first time slot, 30 four-bit message codes alternately derived from bit streams PCM1 and PCM2 in successive halves TC'1, TC'2, . . . TC'29, TC'30 of the next 15 time slots, an identification code SE1 from bit stream PCM1 in the 17$^{th}$ time slot, a corresponding code SE2 from bit stream PCM2 in the 18$^{th}$ time slot, and 28 further four-bit message codes in respective halves TC'31, TC'32, . . . TC'57, TC'58 of the remaining 14 time slots. The immediately following frame starts with a synchronization code B (or A) different from the one which introduced the preceding frame.

The two bottom graphs of FIG. 3 show two replicated bit streams PCM1* and PCM2* slip off from the combined bit stream ADPCM(1+2) at the associated receiving terminal as will now be described.

Figure 4:
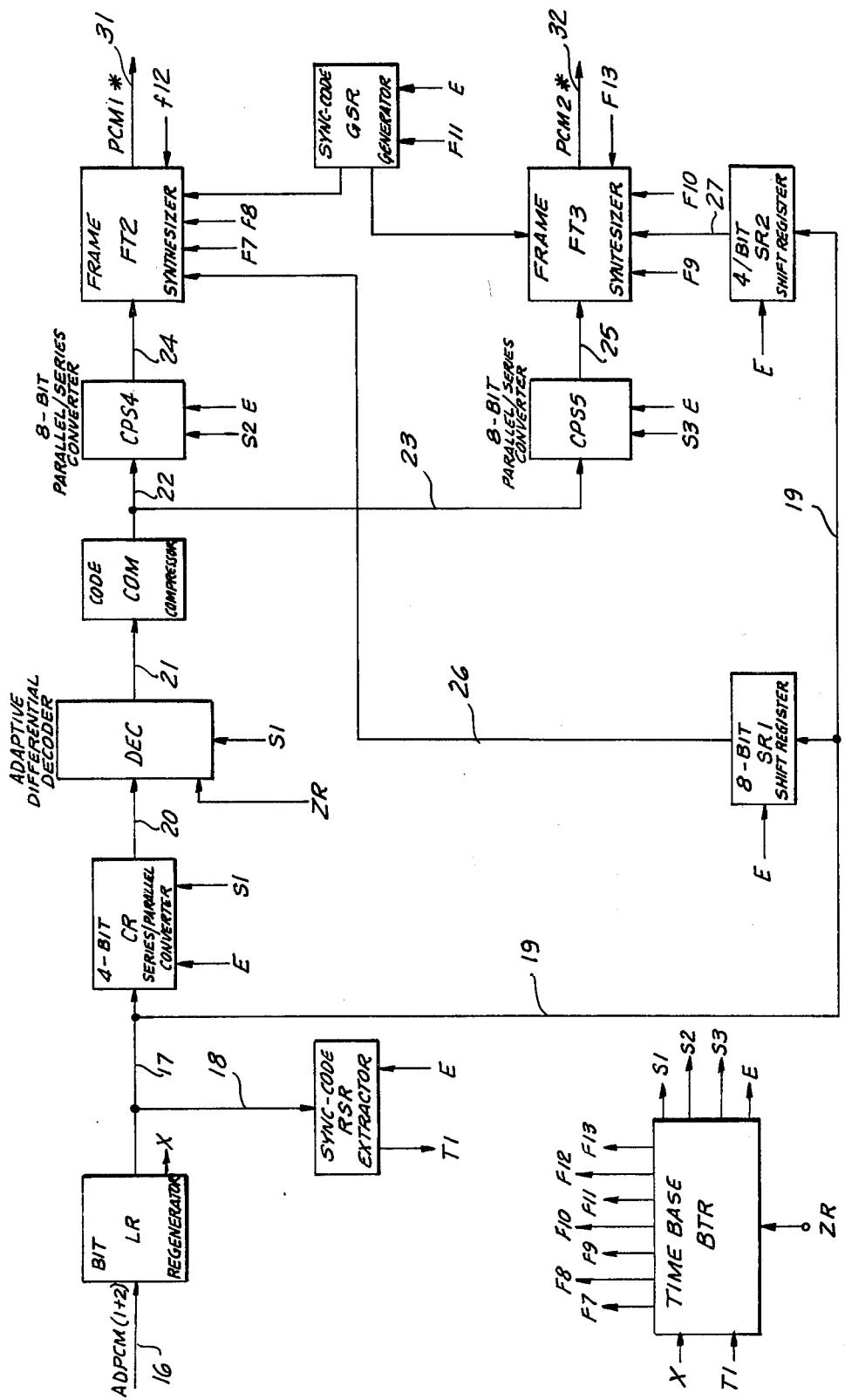
FIG. 4 is a block diagram of a receiving terminal complementary to the transmitting terminal of FIG. 1 and connected thereto via a PCM transmission link.

The receiving terminal shown in FIG. 4 is connected to the output end of the aforementioned PCM link, i.e. to a line 16 carrying the incoming bit stream ADPCM(1+2). This bit stream arrives at another bit regenerator LR extracting from it, in well-known manner, the basic bit frequency of 2048 kHz in the form of a pulse train X fed to a time base BTR. In the usual two-way telecommunication system in which each terminal has a transmitting section and a receiving section, this pulse train X may also serve as the clock pulses CK (FIG. 1) of the associated transmitting section.

The regenerated bit stream issuing from circuit LR is fed via a lead 17 to a 4-bit series/parallel converter CR, via a branch lead 18 to a sync-code extractor RSR and via another branch lead 19 to delay circuits in the form of an 8-bit shift register SR1 and a 4-bit shift register SR2. Extractor RSR, which is substantially identical with circuits RST1 and RST2 of FIG. 1, receives a timing signal E of the basic 2048-kHz frequency from time base BTR and delivers to it a verification signal T1 whenever the incoming bit stream is of the character illustrated in the antepenultimate graph of FIG. 3, i.e. in response to periodic alternation of the two codes A and B at the beginning of successive frames. Thus, detection of a sequence of synchronization codes A - B - A enables the time base BTR to generate various signals S1 - S3 and F7 - F13 as described below.

Pulse train E controls the loading of converter CR and of shift registers SR1 and SR2 in parallel therewith. Converter CR is periodically discharged, by a pulse S1 from time base BTR occurring on every fourth clock cycle, to feed the four bits of each incoming code word via a multiple 20 to an ADPCM decoder DEC which is the complement of coder COD in FIG. 1 and converts each 4-bit word into a 12-bit word fed via a multiple 21 to a code compressor COM substantially replicating the original 8-bit words. The reconstituted 8-bit code words are delivered by way of respective multiples 22 and 23 to a pair of 8-bit parallel/series converters CPS4 and CPS5 which are alternately loaded, during successive time-slot halves, under the control of two relatively staggered pulse trains S2 and S3 from time base BTR whose cadence equals that of pulses B2 - B4 at the transmitting end (FIG. 2). These converters are discharged by pulses E, at the basic bit rate, via respective leads 24 and 25 into a pair of frame synthesizers FT2 and FT3 also receiving the contents of shift registers SR1 and SR2 by way of leads 26 and 27, respectively. A sync-code generator GSR, similar to generator GST of FIG. 1, is stepped by pulses E and is controlled by a square-wave signal F11 of half a frame cadence for feeding synchronization codes A and B to each synthesizer FT2, FT3 during alternate frame periods.

Decoder DEC is cleared, at the beginning of operations, by a manually generated start signal ZR also applied to time base BRT for activating same, in the same way that time base BTT in FIG. 1 is activated by start signal Z.

The two frame synthesizers FT1 and FT2 are conrolled by further signals F7, F8, F12 and F9, F10, F13 from time base BTR. As will be apparent from FIG. 3, the two replicated bit streams PCM1* and PCM2* produced by these synthesizers on outgoing line 31 and 32 lag with reference to the original bit streams PCM1 and PCM2, depicted in graph TT, by a full time slot corresponding to eight clock cycles and by 1½ time slots corresponding to 12 clock cycles, respectively; this lag is due to the delay experienced by the code words in circuits DEC and COM. Signal codes SE1 and SE2, occurring in the 17$^{th}$ and 18$^{th}$ time slots of the composite bit stream ADPCM(1+2), must therefore be delayed by eight and four clock cycles, respectively, in order to be correctly inserted into the 16$^{th}$ time slot of replicated bit streams PCM1* and PCM2*. This delay is introduced by the shift registers SR1 and SR2 emptying into synthesizers FT2 and FT3 in the presence of signals F8 and F10, respectively.

Figure 5:
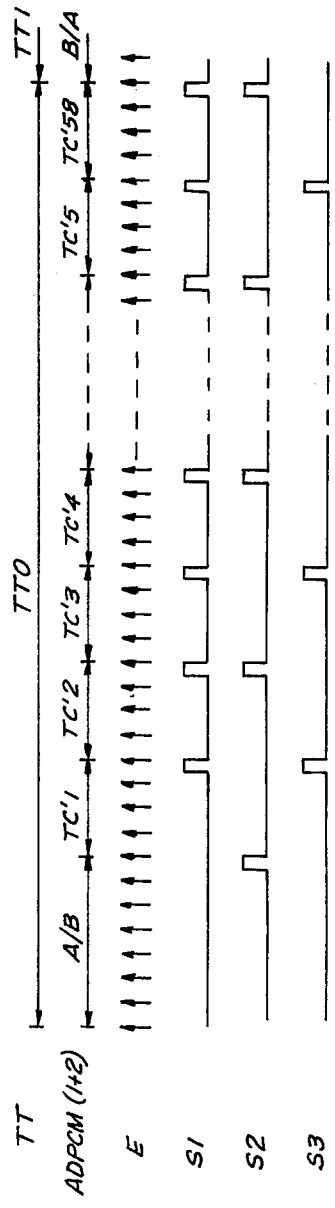
FIGS. 5 and 6 are two sets of graphs relating to the operation of the terminal of FIG. 4.

The two top graphs of FIG. 5, labeled TT and ADPCM(1+2), are substantially identical with the correspondingly designated graphs of FIG. 3, except for a change in scale. The third graph shows the timing pulses E establishing four clock cycles for each of the time-slot halves TC'1, TC'2 etc. Signal S1, shown in the fourth graph, occurs at the end of each time-slot half. Signals S2 and S3, with half the cadence of signal S1, occur at the end and just before the middle of each time slot, respectively. Signal S1 is suppressed during the first time slot of each frame in which the synchronizing signal A or B appears on the output lead 17 of bit regenerator LR (FIG. 4).

Figure 6:
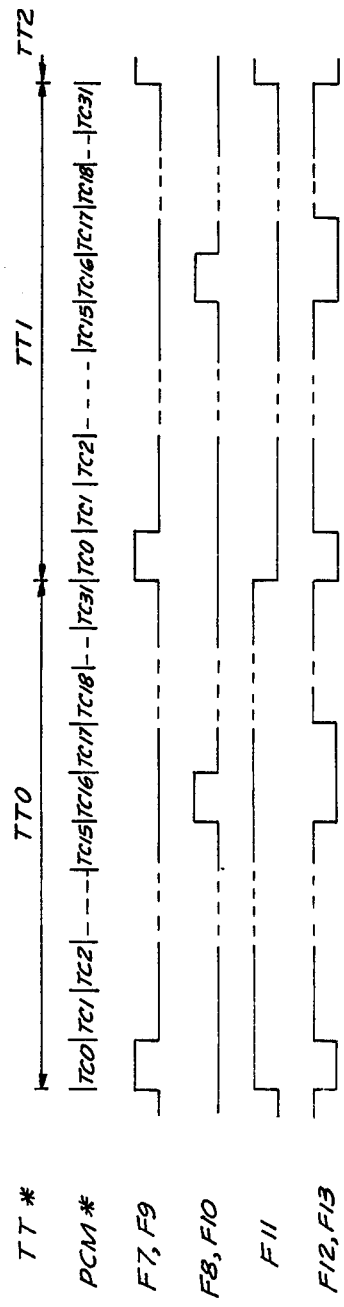

The uppermost graph TT* of FIG. 6 shows two consecutive frames TT0, TT1 as well as part of a third frame TT2 of either of the replicated bit streams PCM1*, PCM2* which are generically represented by the next graph PCM* illustrating their time slots TC0 - TC31. Signals F7 and F9, shown in the third graph, coincide with the first time slots TC0 and enable the insertion of the synchronization code (A or B) from generator GSR. The fourth graph represents the signals F8 and F10 which occur during the 17$^{th}$ time slot TC16 of their representative frames and serve for the introduction of the identification code SE1 or SE2. Signal F11, similar to signal F2 in FIG. 2, is shown in the fifth graph. Signals F12 and F13, bottom graph, are in existence during time slots TC1 - TC15 and TC18 - TC31 and control the transmission of message codes from converters CPS4 and CPS5 via synthesizers FT2 and FT3 to outgoing lines 31 and 32, respectively.

It should be noted that FIG. 6 depicts the several control pulses F7 - F10, F12 and F13 only in their time positions relative to the corresponding bit streams PCM1* and PCM2* and does not take into account the relative staggering of the paired pulses F7 and F9, F8 and F10 or F12 and F13 by half a time slot, dictated by the offset between these two bit streams as shown in the two bottom graphs of FIG. 3. Branch circuits 6, CPS2, 12 and 28, CPS3, 13 in FIG. 1 as well as SR1, 26 and SR2, 27 in FIG. 4 constitute bypasses for the transcoders COD and DEC, respectively, serving to deliver the supervisory codes SE1 and SE2 substantially unchanged from lines 1 and 1' to synthesizer FT1 and from line 16 to synthesizers FT2, FT3.

In conformity with conventional practice, a certain number of frames (e.g. 16) may be combined in a multiframe (or superframe) whose start is indicated by a special code in supervisory time slot TC16 for a proper reading of the channel addresses conveyed in the same time slot. The duration of a frame, at the aforestated bit rate of 2048 kHz, equals 125 μsec.

We claim:

1. A method of transmitting two groups of digitized message samples derived from voice signals, arriving simultaneously at a first terminal in the shape of two sets of $2n$-bit code words respectively forming part of recurrent frames in two original bit streams, to a second terminal via a common PCM signal path linking said terminals, comprising the steps of expanding each $2n$-bit code word at said first terminal into a $3n$-bit code word, converting said $3n$-bit code word by adaptive differential quantization into a substantially equivalent $n$-bit code word, interleaving the $n$-bit code words from said original bit streams in frames of a composite bit stream having the same length as the frames of said original bit streams, transmitting said composite bit stream over said signal path to said second terminal, separating the interleaved $n$-bit code words of said composite bit stream at said second terminal, reconverting the separated $n$-bit code words into $3n$-bit code words by a procedure complementary to said adaptive differential quantization, compressing the resulting $3n$-bit code words into $2n$-bit code words substantially corresponding to the $2n$-bit code words of the original bit streams, and assembling the reconverted $2n$-bit code words into frames forming parts of two reconstituted bit streams substantially replicating said original bit streams.

2. A method as defined in claim 1 wherein $n=4$.

3. A method as defined in claim 1 wherein the frames of said original, composite and reconstituted bit streams are identically structured and are each divided into $m$ message time slots assigned to said code words and $k$ supplemental time slots reserved at least in part for supervisory signal codes, the message time slots of said composite bit stream being split into halves for accommodating respective $n$-bit code words derived from $2n$-bit code words occupying homologous time slots in said original bit streams.

4. A method as defined in claim 3 wherein one supplemental time slot, occurring at the beginning of each frame, contains a synchronization code which is locally generated at said first terminal for said composite bit stream and at said second terminal for each of said reconstituted bit streams.

5. A system for transmitting two groups of digitized message samples derived from voice signals, arriving simultaneously at a first terminal in the shape of two sets of $2n$-bit code words respectively forming part of recurrent frames in two original bit streams, to a second terminal via a common PCM signal path linking said terminals, comprising:

first transcoding means including an adaptive differential quantizer at said first terminal for converting $2n$-bit code words into substantially equivalent $n$-bit code words;

first circuit means at said first terminal for feeding the $2n$-bit code words from said original bit streams to said first transcoding means;

first synthesizing means at said first terminal connected to said first transcoding means for interleaving $n$-bit words derived from the $2n$-bit code words of said original bit streams in frames of a composite bit stream having the same length as the frames of said original bit streams, said first synthesizing means being coupled to said common signal path for transmitting said composite bit stream to said second terminal;

second transcoding means at said second terminal complementary to said first transcoding means for reconverting $n$-bit words into substantially equivalent $2n$-bit code words;

second circuit means at said second terminal coupled to said common signal path for feeding the $n$-bit code words of said composite bit stream to said second transcoding means for reconversion into $2n$-bit code words substantially corresponding to the $2n$-bit code words of said original bit streams;

second synthesizing means at said second terminal connected to said second transcoding means for assembling the reconverted $2n$-bit code words into frames forming part of two reconstituted bit streams substantially replicating said original bit streams;

a code expander in said first circuit means upstream of said differential quantizer; and a complementary code compressor inserted between said second transcoding means and said second synthesizing means.

6. A system as defined in claim 5 wherein the frames of said original, composite and reconstituted bit streams are divided into a predetermined number of time slots identical for all frames, each time slot encompassing $2n$ bit periods, said first circuit means comprising a pair of memories for respectively storing the code words of any frame of said original bit streams, counting means for successively reading out the code words of each frame stored in said memories, and switch means for alternately feeding the read-out code words from said memories to said first transcoding means.

7. A system as defined in claim 5, further comprising first series/parallel conversion means in said first circuit means upstream of said first transcoding means, first parallel/series conversion means between said first transcoding means and said first synthesizing means, second series/parallel conversion means in said second circuit means upstream of said second transcoding means, and second parallel/series conversion means between said second transcoding means and said second synthesizing means.

8. A method of transmitting two groups of digitized message samples, arriving simultaneously at a first terminal in the shape of two sets of $2n$-bit code words respectively forming part of recurrent frames in two original bit streams, to a second terminal via a common PCM signal path linking said terminals, comprising the steps of converting each $2n$-bit code word at said first terminal into a substantially equivalent $n$-bit code word, interleaving the $n$-bit code words from original bit streams in frames of a composite bit stream having the same length as the frames of said original bit streams, transmitting said composite bit stream over said signal path to said second terminal, separating the interleaved $n$-bit code words of said composite bit stream at said second terminal, reconverting the separated $n$-bit code words into $2n$-bit code words substantially corresponding to the $2n$-bit code words of the original bit streams, and assembling the reconverted $2n$bit code words into frames forming part of two reconstituted bit streams substantially replicating said original bit streams, the frames of said original, composite and reconstituted bit streams being identically structured and being each divided into $m$ message time slots assigned to said code words and $k$ supplemental time slots reserved at least in part for supervisory signal codes, the message time slots of said composite bit stream being split into halves for accommodating respective $n$-bit code words derived from $2n$-bit code words occupying homologous time slots in said original bit streams, at least some supervisory signal codes being transferred substantially unchanged from supplemental time slots of said original bit streams via supplemental time slots of said composite bit stream to supplemental time slots of said reconstituted bit streams.

9. A method as defined in claim 8 wherein a first supplemental time slot in the frames of each original bit stream, occupied by an identification code, is immediately followed by a vacant second supplemental time slot, the identification codes from said original bit streams being respectively transferred to homologous first and second supplemental time slots of the frames of said composite bit stream.

10. A method as defined in claim 9 wherein $m = 29$ and $k = 3$.

11. A method as defined in claim 10 wherein said first and second supplemental time slots are the 17th and 18th time slots of a frame.

12. A method as defined in claim 8 wherein said message samples are derived from voice signals, said $n$-bit code words being obtained from said $2n$-bit code words by adaptive differential quantization.

13. A method as defined in claim 12 wherein $n = 4$, the 8-bit code words of said original bit streams being expanded at said first terminal into 12-bit code words prior to converting them into 4-bit code words by said adaptive differential quantization and said 4-bit code words are reconverted at said second terminal, by a procedure complementary to said adaptive differential quantization, into 12-bit code words followed by compression thereof into 8-bit code words.

14. A method of transmitting two groups of digitized message samples, arriving simultaneously at a first terminal in the shape of two sets of $2n$-bit code words respectively forming part of recurrent frames in two original bit streams, to a second terminal via a common PCM signal path linking said terminals, comprising the steps of converting each $2n$-bit code word at said first terminal into a substantially equivalent $n$-bit code word, interleaving the $n$-bit code words from said original bit streams in frames of a composite bit stream having the same length as the frames of said original bit streams, transmitting said composite bit stream over said signal path to said second terminal, separating the interleaved $n$-bit code words of said composite bit stream at said second terminal, reconverting the separated $n$-bit code words into $2n$-bit code words substantially corresponding to the $2n$-bit code words of the original bit streams, and assembling the reconverted $2n$-bit code words into frames forming part of two reconstituted bit streams substantially replicating said original bit streams, the frames of said original, composite and reconstructed bit streams being identically structured and being each divided into $m$ message time slots assigned to said code words and $k$ supplemental time slots reserved at least in part for supervisory signal codes, the message time slots of said composite bit stream being split into halves for accommodating respective $n$-bit code words derived from $2n$-bit code words occupying homologous time slots in said original bit streams, one of said supplemental time slots occurring at the beginning of each frame and containing a synchronization code which is locally generated at said first terminal for said composite bit stream and at said second terminal for each of said reconstituted bit streams.

15. A system for transmitting two groups of digitized message samples, arriving simultaneously at a first terminal in the shape of two sets of $2n$-bit code words respectively forming part of recurrent frames in two original bit streams, to a second terminal via a common PCM signal path linking said terminals, comprising:

first transcoding means at said first terminal for converting $2n$-bit code words into substantially equivalent $n$-bit code words;

first circuit means at said first terminal for feeding the $2n$-bit code words from said original bit streams to said first transcoding means;

first synthesizing means at said first terminal connected to said first transcoding means for interleaving $n$-bit code words derived from the $2n$-bit code words of said original bit streams in frames of a composite bit stream having the same length as the frames of said original bit streams, said first synthesizing means being coupled to said common signal path for transmitting said composite bit stream to said second terminal;

second transcoding means at said second terminal complementary to said first transcoding means for reconverting $n$-bit code words into substantially equivalent $2n$-bit code words;

second circuit means at said second terminal coupled to said common signal path for feeding the $n$-bit code words of said composite bit stream to said second transcoding means for reconversion into $2n$-bit code words substantially corresponding to the $2n$-bit code words of said original bit streams; and second synthesizing means at said second terminal connected to said second transcoding means for assembling the reconverted $2n$-bit code words into frames forming part of two reconstituted bit streams substantially replicating said original bit streams;

the frames of said original, composite and reconstituted bit streams being divided into a predetermined number of time slots identical for all frames, each time slot encompassing $2n$-bit periods, said first circuit means comprising a pair of memories for respectively storing the code words of any frame of said original bit streams, counting means for successively reading out the code words of each frame stored in said memories, and switch means for alternately feeding the read-out code words from said memories to said first transcoding means, said frames being identically structured and being each divided into $m$ message time slots assigned to said code words and $k$ supplemental time slots reserved at least in part for supervisory signal codes, said first circuit means including a pair of first branches bypassing said first transcoding means and extending from said memories to said first synthesizing means for transferring supervisory signal codes substantially unchanged from supplemental time slots of said original bit streams to supplemental time slots of said opposite bit stream, said second circuit means including a pair of second branches bypassing said second transcoding means and extending from said common signal path to said second synthesizing means for further transferring said supervisory signal codes substantially unchanged to supplemental time slots of said reconstituted bit streams.

16. A system as defined in claim 15 wherein said message samples are derived from voice signals, said first transcoder being an adaptive differential quantizer.

17. A system as defined in claim 16, further comprising a code expander in said first circuit means upstream of said differential quantizer and a complementary code compressor inserted between said second transcoding means and said second synthesizing means.

18. A system as defined in claim 15 wherein said first branches are provided with timing means for relatively staggering the transfer of concurrently arriving supervisory signals to said first synthesizing means, said second branches being provided with compensatory delay means.

19. A system as defined in claim 15 wherein one supplemental time slot at the beginning of each frame of said original bit streams contains a synchronization code, further comprising first extractor means at said first terminal for detecting said synchronization code, a first local generator connected to said first synthesizing means for introducing an analogous code into a supplemental time slot at the beginning of each frame of said composite bit stream under the control of said first extractor means, second extractor means at said second terminal for detecting said analogous code, and a second local generator connected to said second synthesizing means for introducing a replica of said synchronization code into a supplemental time slot at the beginning of each frame of said reconstituted bit streams under the control of said second extractor means.

20. A system as defined in claim 19 wherein said first terminal includes first timing means for controlling said first circuit means and said first synthesizing means in response to a verification signal from said first extractor means, said second terminal including second timing means for controlling said second circuit means and said second synthesizing means in response to a verification signal from said second extractor means.

21. A system as defined in claim 20 wherein said first and second generators are each programmed to produce two distinct codes in alternate frames under the control of said first and second timing means, respectively.

* * * * *